INVENTORS.
Anthony C. De Napoli,
Edward E. Williamson
By Mueller & Aichele
Attys.

TELEVISION RECEIVER

Filed Dec. 1, 1955 4 Sheets-Sheet 2

INVENTORS.
Anthony C. De Napoli,
Edward E. Williamson,
By Mueller & Aichele
Attys.

TELEVISION RECEIVER

Filed Dec. 1, 1955

INVENTORS.
Anthony C. DeNapoli,
Edward E. Williamson
By Mueller & Aichele Att'ys.

TELEVISION RECEIVER

Filed Dec. 1, 1955

INVENTORS.
Anthony C. De Napoli
Edward E. Williamson,
By Mueller & Aichele Att'ys.

United States Patent Office 2,970,311
Patented Jan. 31, 1961

2,970,311

TELEVISION RECEIVER

Anthony C. De Napoli, Mount Prospect, and Edward E. Williamson, Chicago, Ill., assignors to Motorola, Inc., Chicago, Ill., a corporation of Illinois Filed Dec. 1, 1955, Ser. No. 550,285

5 Claims. (Cl. 178—7.8)

The present invention relates to an improved mechanical construction for a television receiver, and it relates more particularly to an improved supporting structure for the chassis and cathode ray image reproducer of the receiver.

It has been the usual practice in the prior television receiver art to mount the chassis horizontally in the enclosing cabinet, and to support the cathode ray image reproducer (or picture tube, as it is usually referred to) on the chassis. However, it is preferable for convenience of adjustment to have the manual controls of the television receiver adjacent the top of the picture tube rather than along the bottom, and recent designs have incorporated this feature. One simple way to achieve this is to mount the chassis vertically to one side of the picture tube with the manual controls protruding through the front panel along one side of the viewing screen and with, for example, the main tuner knob being disposed adjacent an upper corner of the viewing screen. With such an arrangement, it is infeasible to mount the picture tube on the chassis and some other construction must be resorted to. Moreover, the use of printed circuits in television receivers also dictates a support for the picture tube by some means other than on the chassis. This is because the printed circuit chassis is usually composed of one or more thin insulating panels that do not have the strength to support the picture tube.

It is a general object of the present invention to provide an improved television receiver which is constructed so that the picture tube is supported by means other than the chassis of the receiver.

Another object of the invention is to provide such an improved television receiver in which the tube is rigidly supported by a simple supporting structure, and yet is easily and conveniently removable for servicing or replacement purposes.

Yet another object of the invention is to provide an improved television receiver in which the chassis, front panel, and picture tube are constructed as a rigid independent standardized assembly that can be easily inserted or removed from any of a variety of cabinet sizes and styles.

A feature of the invention is the provision of a television receiver in which the picture tube is completely supported by the front panel or bezel plate of the receiver by means of a flexible strap that completely surrounds the front rim of the picture tube and which has radially protruding ears that may be secured to the bezel plate by simple fasteners.

Another feature of the invention is the provision of such an improved television receiver in which the flexible strap is tightly and intimately held taut around the rim of the picture tube to function as an anti-implosion means for the tube so as to render unnecessary for the usual safety glass across the viewing screen.

In another feature of the invention is the provision of such an improved television receiver in which the tube is supported in the manner described in the preceding paragraph, in which a bottom panel is secured to the bezel plate, and in which the chassis of the receiver is mounted as a side wall against the bezel and the bottom panel to form a rigid unitary assembly with the panel and the picture tube.

This latter feature provides a standardized metal unit that may be used in conjunction with different cabinet sizes and styles, such as table models and consoles. When the assembly is used in a table model, the bottom panel forms the bottom of the receiver, and when it is used in a console, the bottom panel forms the shelf of the unit.

The above and other features of the invention which are believed to be new are set forth with particularity in the appended claims. The invention itself, however, together with further objects and advantages thereof, may best be understood by reference to the following description when taken in conjunction with the accompanying drawing in which:

Figures 1, 2:
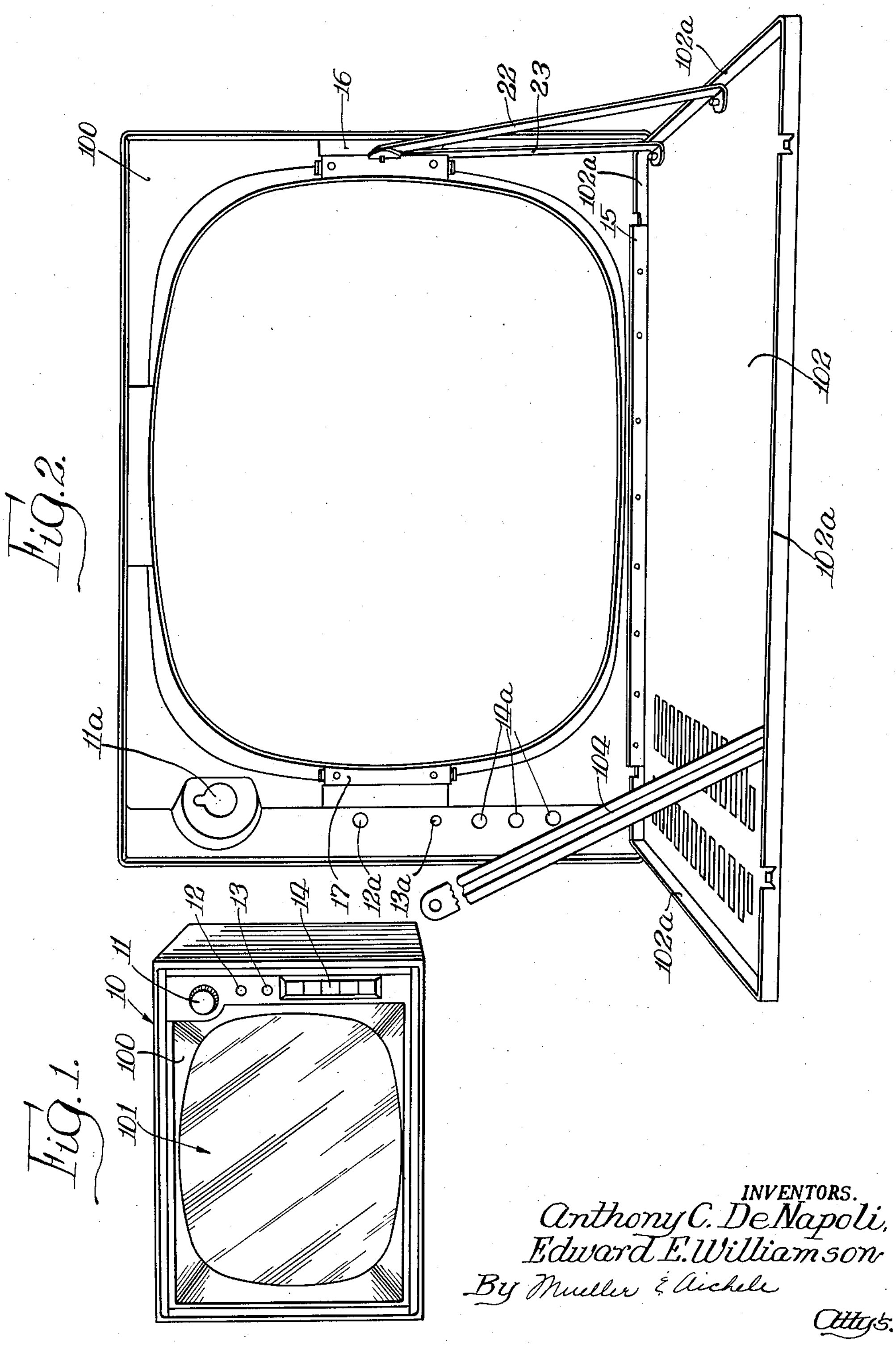
Fig. 1 is a perspective view of a television receiver which may include the improved construction of the invention.
Fig. 2 is a view of the construction of the invention with both the chassis and the picture tube removed.

The invention provides a television receiver which comprises a cathode ray image reproducer having a neck portion and further having a bulbous portion with a viewing screen disposed at one end thereof. There is a rigid bottom panel in the assembly, and a rigid apertured front panel or bezel plate secured thereto and essentially at right angles therewith. The chassis for the electronic components of the receiver is secured at right angles to the bottom panel and to the front panel effectively forming a side wall for the assembly so as to provide a rigid three-wall structure. A flexible metallic strap is rigidly mounted on the bulbous portion of the image reproducer and it encircles the periphery of this portion adjacent the viewing screen in intimate contact with the rim of the viewing screen. A first pair of mounting brackets is affixed to the strap, and these brackets extend radially outward from the bulbous portion at opposite sides thereof. A second pair of mounting brackets is affixed to the front panel in respective alignment with the first pair when the reproducer is in its mounting position, and fastening means secures the first and second pairs of mounting brackets together to mount the reproducer on the front panel with its viewing screen being viewable through the aperture in that panel.

Reference will now be made to the drawings for a detailed description of a specific example of the invention. The receiver shown in Fig. 1 includes a cabinet 10 which is in the form of a three-sided structure having a pair of sides and a top, but having no bottom or front. A usual detachable back panel may be provided for the cabinet. The assembly enclosed by cabinet 10 has an apertured front panel 100 which is essentially planar and which usually is referred to as a bezel plate. A picture tube 101 is mounted in the manner to be described so that its viewing screen is viewable through the aperture in bezel plate 100 and is essentially in co-planar relation with the bezel. The operating controls for the receiver are disposed in vertical alignment up one side of the bezel with the main tuner control 11, for example, being adjacent the upper right hand corner of the viewing screen of picture tube 101, and with the other controls 12, 13 and 14 extending down that side.

As more clearly shown in Fig. 2, the bezel plate or front panel 100 is formed with a lipped aperture therein, and with the lip of the aperture extending inwardly to engage the face of the picture tube and form a frame for the viewing screen. The front panel has a series of apertures 11*a*, 12*a*, 13*a* and 14*a* extending down one side thereof through which the various manual controls of the receiver extend. A channel 15 is welded to the inner surface of the front panel adjacent its bottom edge, and this channel receives an upwardly extending lip 102*a* of a rigid bottom panel 102, which lip extends completely around the bottom panel for providing increased rigidity of that panel. The bottom panel is conveniently secured to the front panel essentially perpendicular thereto, by placing the lip 102*a* in channel 15 and then welding the channel to the lip.

The front panel 100 also has a pair of mounting brackets 16, 17 welded thereto on opposite sides of the central aperture and adjacent that aperture. A pair of elongated brackets 22, 23 are welded or otherwise fastened to the bottom panel 102 and to the bracket 16 to form a brace for the front panel and provide increased rigidity to the assembly. Similar brackets may be secured to the bottom panel and to bracket 17 to form additional braces.

The apertured front panel 100 is preferably made of sheet metal, with the channel 15 and brackets 16, 17 welded thereto as previously noted. However, this bezel can be cast when desired and the channel 15 and brackets 16, 17 can then be formed integrally with the panel and cast simultaneously therewith.

Figure 3:
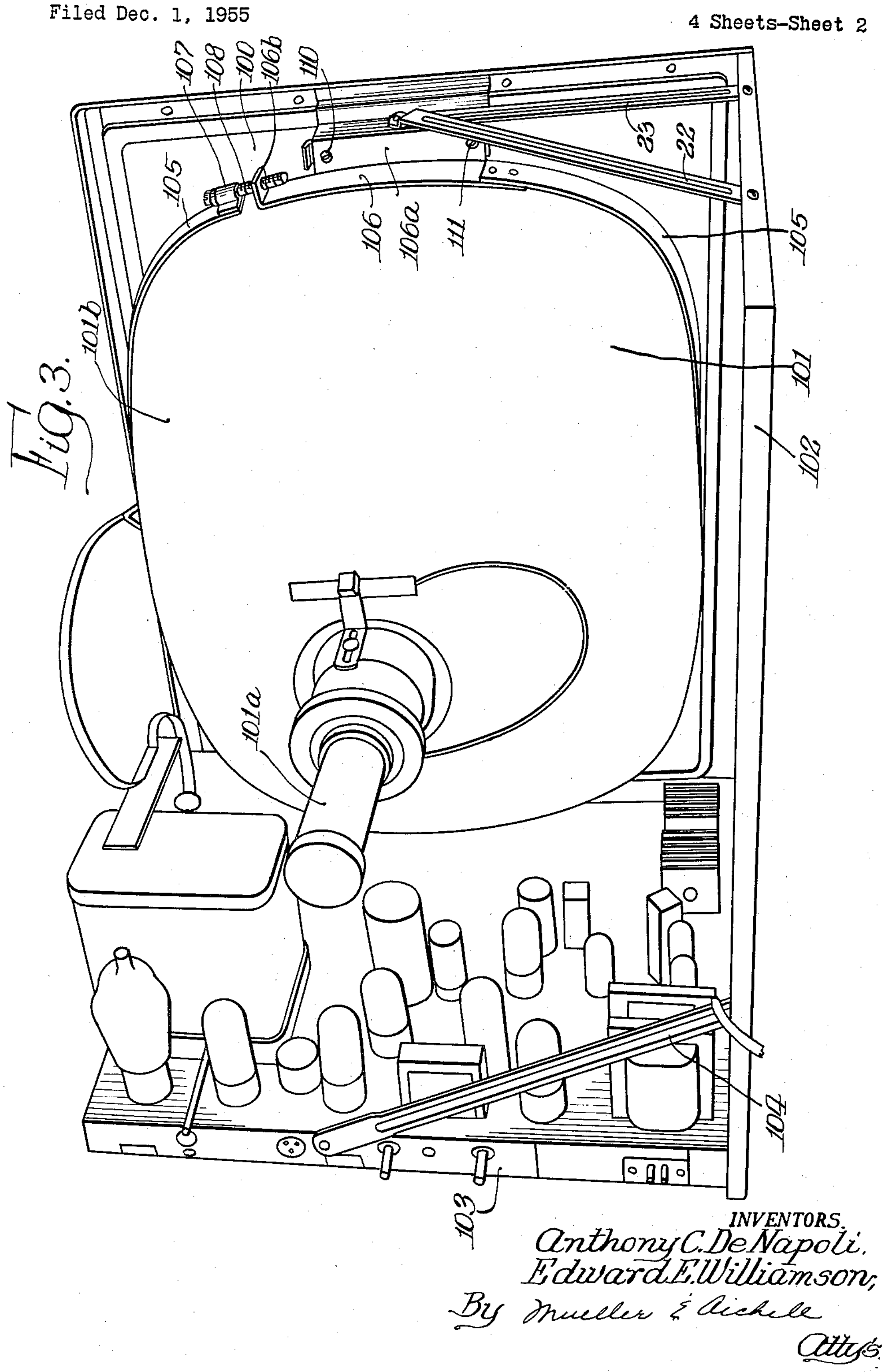
Fig. 3 is a view of the receiver with the cabinet removed, to illustrate the unitary assembly of the invention.

As shown in Fig. 3, the chassis 103 which supports the electronic components of the television receiver is mounted between the bottom panel 102 and the front panel 100 in perpendicular relation with both these panels effectively to form a side wall for the assembly. The various manual controls 11, 12, 13 and 14 of the chassis protrude through the respective apertures 11*a*, 12*a*, 13*a* and 14*a* in the front panel as previously described. The chassis is secured to the front panel and bottom panel by any appropriate fastening means such as by screws extending through the panels into the sides of the chassis. Increased rigidity may be obtained by use of an inclined elongated bracket 104 fastened to the bottom panel and to the chassis and which, like the brackets 112 and 113, functions as a brace.

Figure 4:
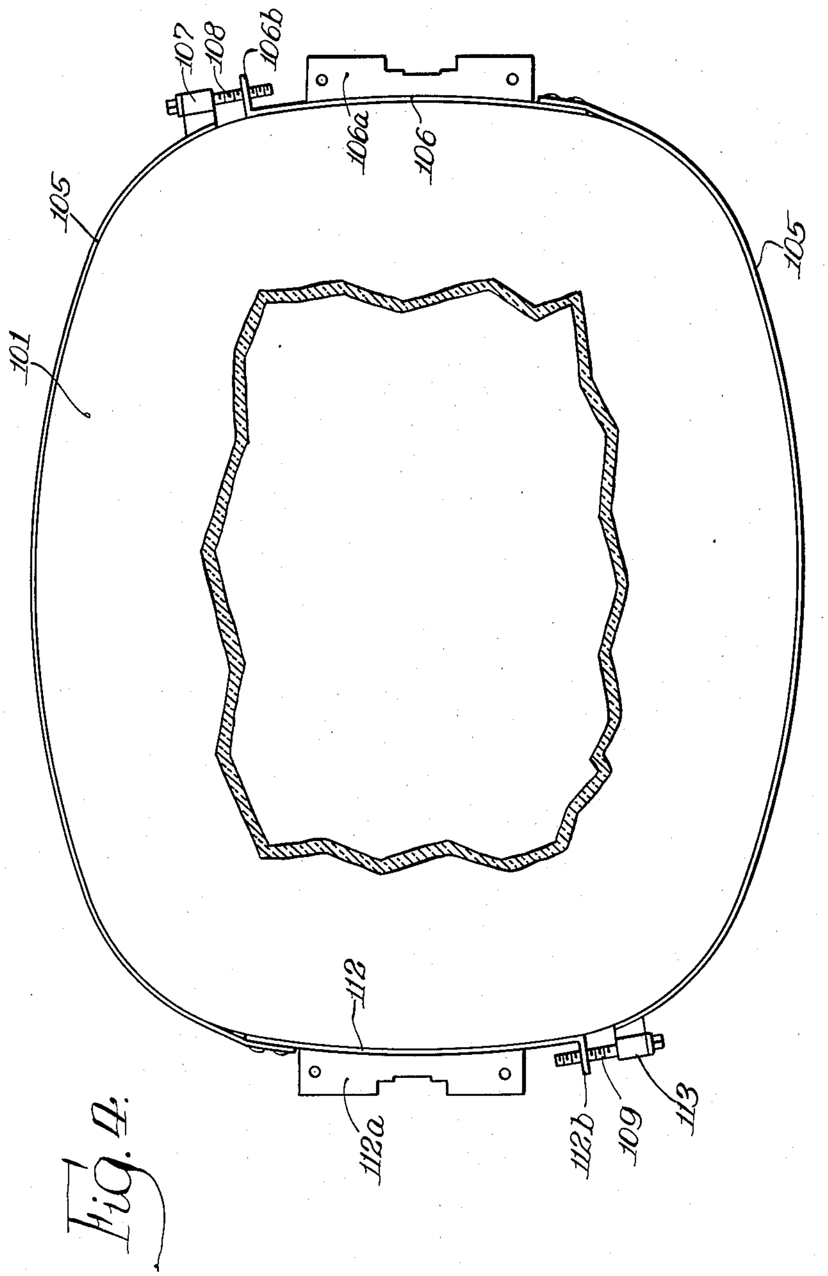
Fig. 4 shows the picture tube and supporting brackets mounted therein in accordance with the invention.

Fig. 4 is a rear view of the picture tube 101 of the receiver and, as shown in Fig. 3, this tube has the usual neck portion 101*a* and enlarged bulbous portion 101*b* with a viewing screen being disposed at the end of the bulbous portion. A flexible metallic strap 105 is tightly drawn around the rim of the bulbous portion adjacent the viewing screen by a pair of screw fasteners 108, 109. Screw 108, for example, is threaded through a boss 107 fastened to one end of strap 105, and the other end of the strap is riveted to a bracket 106 which has an ear portion 106*a* extending radially outwardly from the bulbous portion of the tube. The other end of the bracket 106 is turned outwardly to form a lug 106*b* into which the fastener 108 is threaded. A bracket 112 similar to bracket 106 is supported in the same manner by strap 105 at the opposite side of the bulbous portion. Bracket 112 has an ear portion 112*a* extending radially outwardly from the bulbous portion and has an upturned lug 112*b* into which screw 109 is threaded, the screw being supported in a boss 113 formed in the flexible strap 105. The radially extending ear portions 106*a* and 112*a* impart rigidity to the mounting brackets 106 and 112.

The flexible strap 105 is drawn tightly around the rim of the viewing screen of picture tube 101 by tightening the screw fasteners 108, 109 so that the strap is taut and in intimate contact with the rim of the picture tube. A thin layer of cloth tape of the order of .01 inch thick may be interposed between the strap and the periphery of the tube. With the strap drawn tightly around the tube, an anti-implosion means is provided and any fracture of the tube does not result in an implosion with flying glass fragments.

Figure 5:
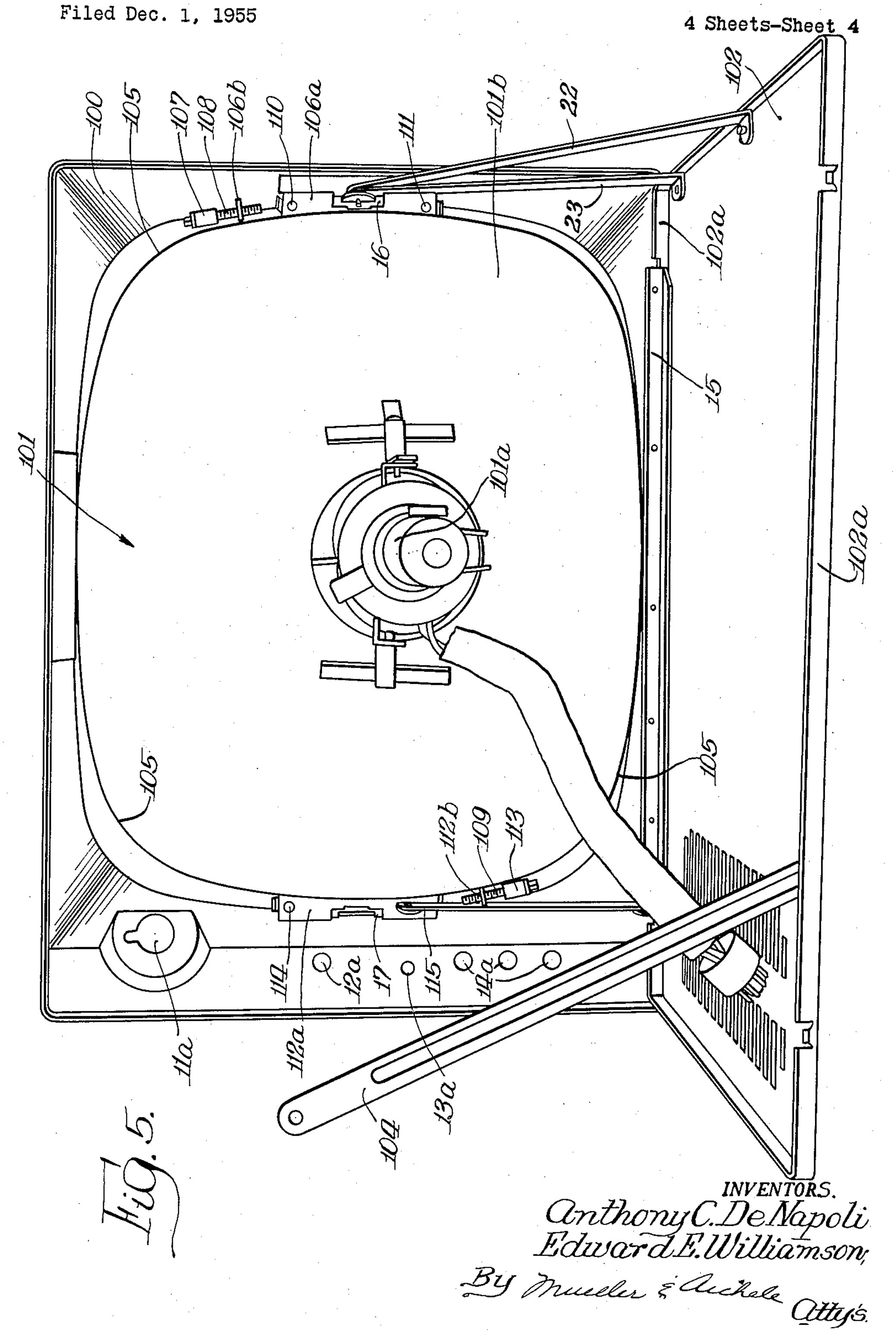
Fig. 5 is a back view of the assembly of Fig. 3 with the chassis removed.

When the picture tube 101 is in its mounting position with its screen viewable through the aperture in front panel 100, the ears 106*a* and 112*a* and respective brackets 106 and 112, as shown in Fig. 5, are in alignment with brackets 16 and 17 in the front panel. The picture tube may then be rigidly mounted on the front panel by set screws 110, 111 and 114, 115 which secure the ear 106*a* to bracket 16 and the ear 112*a* to bracket 17.

This forms a simple, compact and rigid structure. Close tolerances can be achieved since the front panel bottom and chassis are all composed of metal which can be worked to such close tolerances. The picture tube 101 is rigidly and securely supported on the front panel by the brackets described herein. Moreover, this tube may be removed in a simple manner merely by removing the set screws 110, 111 and 114, 115. The strap 105 additionally functions as an anti-implosion means for the tube so that the necessity of a safety glass across the aperture in the front panel 100 is obviated. The front panel 100, bottom 102 and chassis 103 form a rigid assembly which is braced by brackets 112, 113 and 104 for additional rigidity. This assembly can be inserted or removed from a three-sided cabinet simply and conveniently so that all operating parts are exposed for easy and convenient servicing. Moreover, the assembly conforms to a standardized unit that can be used with a variety of shapes and types of cabinets as previously mentioned.

The invention provides, therefore, a unique and improved television receiver in which the picture tube is mounted in a simplified manner to form a compact assembly and is entirely supported by the front panel rather than on the chassis of the receiver.

We claim:

1. A supporting structure for a cathode ray tube having a neck portion and a bulbous portion having a viewing screen surrounded by a rim portion, said structure including in combination, first and second elongated brackets extending along the rim portion on opposite sides of the tube, a first flat strap portion connecting said first and second brackets and extending therebetween about the rim portion of the tube, a second flat strap portion connecting said first and second brackets and extending therebetween about the rim portion of the tube, said first and second brackets and said first and second strap portions forming a continuous uniplanar band completely encircling the periphery of the bulbous portion of the tube about the rim portion thereof and forming the sole support for the tube, and support means connected to said first and second brackets for supporting the same in fixed position, said support means forming the sole support for said brackets and said strap portions.

2. A supporting structure for a cathode ray tube having a neck portion and a bulbous portion having a viewing screen surrounded by a rim portion, said structure being adapted to hold the tube with the viewing screen thereof in a substantially vertical plane and including in combination, first and second elongated brackets having portions extending vertically along and engaging the rim portion of the tube on opposite sides thereof, a first flexible metallic strap portion connecting said first and second brackets and extending about the rim portion at the top of the tube, a second flexible metallic strap portion connecting said first and second brackets and extending about the rim portion at the bottom of the tube, said elongated brackets having angle portions extending radially from the rim portion of the tube, support means engaging said radially extending portions of said first and second brackets for supporting the same, said first and second brackets and said first and second strap portions cooperating to form a continuous uniplanar band completely encircling the periphery of the bulbous portion of the tube about the rim portion thereof and forming the sole support for the tube.

3. A supporting structure for a cathode ray tube having a neck portion and a bulbous portion having a viewing screen surrounded by a rim portion, said structure including in combination, first and second elongated rigid brackets extending along and engaging the rim portion on opposite sides of the tube, a first flexible strap connected to said first bracket and extending about the rim portion of the tube toward said second bracket, adjustable means connecting said first strap to said second bracket, a second flexible strap connected to said second bracket and extending about the rim portion of the tube toward said first bracket, adjustable means connecting said second strap to said first bracket, a supporting base, and support means extending from said base and engaging said first and second brackets for supporting the same, said first and second brackets and said first and second strap portions forming a continuous uniplanar band completely encircling the periphery of said bulbous portion of the tube about the rim portion thereof and forming the sole support for the tube, said adjustable means being adjusted to pull said strap portions taut whereby the band encircling the rim portion of the tube tends to compress the same.

4. In a television receiver including a cathode-ray image reproducer having a neck portion and further having a bulbous portion with a viewing screen disposed at one end thereof, the combination including, an upright supporting structure for supporting said reproducer with said viewing screen in essentially co-planar relation therewith, uniplanar strap means encircling the periphery of the bulbous portion of the image reproducer at its greatest peripheral dimension adjacent the viewing screen, said strap means including a pair of elongated brackets on opposite sides of and extending along the bulbous portion and flexible strap portions interconnecting said brackets and extending about the bulbous portion, said brackets having portions extending radially outward from the reproducer at opposite sides thereof, mounting means affixed to said supporting structure in alignment with said radially extending portions of said brackets when the reproducer is in its mounted position, and means for securing said brackets to said mounting means to mount the reproducer on said supporting means and providing the sole means for supporting the reproducer in the receiver.

5. In a television receiver including a cathode-ray image reproducer having a neck portion and further having a bulbous portion with a viewing screen disposed at one end thereof, the combination including, a rigid bottom panel, a rigid apertured front panel secured to said bottom panel, uniplanar metallic strap means rigidly mounted on the bulbous portion of the image reproducer and having flexible portions encircling the periphery thereof at its greatest peripheral dimension adjacent the viewing screen, said strap means including first and second elongated mounting brackets having surfaces extending vertically along the bulbous portion at opposite sides thereof and having portions extending radially therefrom, said first and second brackets forming the sole support for said strap means and the reproducer, a pair of mounting brackets affixed to said front panel in respective alignment with said radially extending portions of said first and second brackets when said reproducer is in its mounting position, and means for securing said first and second mounting brackets to said brackets of said pair to mount said reproducer on said front panel with said viewing screen viewable through the aperture therein and to provide the sole means for supporting said reproducer in said receiver.

References Cited in the file of this patent

UNITED STATES PATENTS

| | | |
|---|---|---|
| 690,928 | Clausen | Jan. 14, 1902 |
| 835,427 | Hill | Nov. 6, 1906 |
| 2,743,435 | Wayne | Apr. 24, 1956 |
| 2,757,889 | Cady | Aug. 7, 1956 |
| 2,851,679 | Wayne | Sept. 9, 1958 |
| 2,870,438 | Solheim | Jan. 20, 1959 |
| 2,884,626 | Fink et al. | Apr. 28, 1959 |
| 2,896,200 | Aeschliman | July 21, 1959 |
| 2,917,735 | Travis | Dec. 15, 1959 |
| 2,922,997 | Solheim | Jan. 26, 1960 |

FOREIGN PATENTS

| | | |
|---|---|---|
| 643,115 | Great Britain | Sept. 15, 1950 |